(12) United States Patent
Ruberg et al.

(10) Patent No.: US 7,133,408 B1
(45) Date of Patent: Nov. 7, 2006

(54) SHARED DECODER

(75) Inventors: Alan T. Ruberg, Foster City, CA (US);
Gerard A. Wall, San Jose, CA (US);
Lawrence L. Butcher, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 749 days.

(21) Appl. No.: 09/687,562

(22) Filed: Oct. 13, 2000

(51) Int. Cl.
*H04L 12/66* (2006.01)

(52) U.S. Cl. .................. 370/401; 370/466; 370/535

(58) Field of Classification Search ............. 370/480, 370/493, 498, 521, 532, 535, 537, 401, 466
See application file for complete search history.

(56) References Cited

U.S. PATENT DOCUMENTS

| | | | | | |
|---|---|---|---|---|---|
| 6,028,632 | A | * | 2/2000 | Siong et al. | 375/240.01 |
| 6,031,577 | A | * | 2/2000 | Ozkan et al. | 348/465 |
| 6,124,880 | A | * | 9/2000 | Shafiee | 348/14.08 |
| 6,246,490 | B1 | * | 6/2001 | Sebestyen | 358/425 |
| 6,297,845 | B1 | * | 10/2001 | Kuhn et al. | 348/192 |
| 6,816,904 | B1 | * | 11/2004 | Ludwig et al. | 709/226 |

OTHER PUBLICATIONS

Bilas et al. "Real-Time Parallel MPEG-2 Decoding in Software". IEEE. pp. 197-203.*
Microsoft. "Computer Dictionary" Copyright 1994. p. 90.*
Swan et al., "An Internet Mbone Broadcase Management System", Univ. of CA Berkeley, Master Thesis, Jun. 1997, 16 pp., http://bmrc.berkeley.edu/research/publications/1997/140/aswan.html.
The Open Mash Consortium, "Using Media Gateways", 4 pp., http://www.openmash.org/applications/usage/mega.html.

* cited by examiner

*Primary Examiner*—Derrick Ferris
(74) *Attorney, Agent, or Firm*—Martine Penilla & Gencarella, LLP

(57) ABSTRACT

A method and apparatus for decoding signals received from a network and distributing the decoded signals to multiple users. A bulk decoder coupled to a network decodes data received from the network and transmits the decoded data to an interconnect for distribution to a plurality of users. The number and type of bulk decoders may be adjusted in accordance with system load.

8 Claims, 7 Drawing Sheets

SHARED DECODER

FIELD OF THE INVENTION

This invention relates to data decoding, more particularly, to data decoding in a network environment.

Sun, Sun Microsystems, the Sun Logo, Java, Java Developer Connection, Solaris, JavaOne, Sun Video Plus, and Write Once, Run Anywhere, the Network is the Computer, and Appliance Link Protocol, are trademarks or registered trademarks of Sun Microsystems, Inc. in the United States and other countries.

BACKGROUND OF THE INVENTION

Computers and computer networks are used to exchange information in many fields such as media, commerce and telecommunication. One form of information that is commonly exchanged is video data (or image data), i.e., data representing a digitized image or sequence of images. A video conferencing feed is an example of telecommunication information which includes video data. Other examples of video data include video streams or files associated with scanned images, digitized television performances, and animation sequences, or portions thereof, as well as other forms of visual information that are displayed on a display device. Video information may be synthesized by artificially rendering video data from two or three-dimensional computer models.

Another form of information that is commonly exchanged is audio data (i.e., data representing a digitized sound or sequence of sounds). Voice telephone transmissions and video conferencing feeds are examples of telecommunication information which include audio data. Other examples of audio data include audio streams or files associated with digitized music, radio and television performances, or portions thereof, though audio data may be associated with any type of sound waveform. It is also possible to synthesize sound waveforms by artificially generating audio data having desired magnitude and frequency characteristics.

The exchange of information between computers on a network can be described in terms of between a "transmitter" and a "receiver." In video applications, the information being exchanged contains video data and the services provided by the transmitter are associated with the processing and transmission of the video data. Similarly, in audio applications, the information being exchanged contains audio data and the services provided by the transmitter are associated with the processing and transmission of the audio data. Conventionally, multiple services provided by one or more transmitters may provide data using different protocols. The use of different protocols increases the complexity of the receivers because of the need to accommodate the various protocols. In addition, the amount of data associated with the applications may be very large. Thus, transmission of such large amounts of data over a network may cause bandwidth utilization concerns.

FIG. 1 illustrates a conventional network system 100 comprising multiple transmitters 102, 104 and 106 for sourcing data over network 108 to a single receiver 110. Receiver 110 is equipped with one or more output devices for providing video/audio output associated with received data. Transmitters 102, 104 and 106 are coupled via network 108 which may be, for example, a local area network (LAN). Each transmitter transmits data using a different protocol. For example, transmitter 102 transmits data along network connection 112A using protocol A; transmitter 104 transmits data along network connection 112B using protocol B; and transmitter 106 transmits data along network connection 112C using protocol C.

Receiver 110 may receive data over network connection 114 from network 108 under any of protocols A, B or C, as well as any other protocols used by other transmitters connected to network 108, or used by multiple services embodied within one of transmitters 102, 104 and 106. As such, receiver 110 needs to be equipped with different cards (i.e., specialized hardware for data processing) or software plug-ins to support each protocol. The need to accommodate different protocols increases the complexity of receiver 110 and necessitates hardware or software upgrades when new protocols are developed.

In a network architecture, where multiple receivers may receive data having different protocols from the network and where decoders are often specific to certain protocols, providing data decoding resources at each receiver to accommodate each type of protocol often requires multiple decoders which may be very expensive. Furthermore, the data decoding resources associated with a particular receiver may be under-utilized when a receiver (or desktop unit) is not in use.

In cases where data processing hardware is centralized, for example, at a server, adding hardware into a general purpose computer may be impractical because of the lack of physical space (e.g., slots) at the general purpose computer. In addition, centralization produces a single point of failure. For example, the server would not be available to users while decoding hardware is being inserted into the system or if the decoder fails.

SUMMARY OF THE INVENTION

In accordance with the present invention, method and apparatus for decoding data in various data formats on a network are provided. In one embodiment, specialized decoding resources that do not become part of the user's desktop computing resource and do not become part of the general purpose server are provided. In one embodiment, the specialized decoding resources have the ability to handle multiple data formats (e.g., protocols) and are extensible in accordance with the load.

In accordance with one embodiment of the invention, a server and a bulk decoder are coupled to a network. The bulk decoder decodes data received from the network in accordance with commands from the server and transmits the decoded data to an interconnect. An output device coupled to the interconnect accepts the decoded data for display, archive, and other purposes.

In one embodiment, the bulk decoder includes a central processor being controlled by the server, a demultiplexer coupled to the central processor for demultiplexing data received, at least one decoder coupled to the demultiplexer for decoding the demultiplexed signal, and a multiplexer coupled to the decoder for multiplexing the decoded data. In one embodiment, the bulk decoder includes a processor that converts various data formats into one protocol prior to distribution to the output devices.

This summary is not intended to limit the scope of the invention, which is defined solely by the claims attached hereto.

While specific embodiments are described and illustrated herein, these embodiments are not intended to limit the scope of the invention, which is susceptible to various modifications and alternative forms.

DETAILED DESCRIPTION OF THE INVENTION

Method and apparatus for decoding data in various data protocols in a network environment are provided. In accordance with the present invention, decoding resources do not become part of the user's desktop computing resource and do not become part of the general purpose server. Further, the decoding resource is capable of handling multiple data formats (e.g., protocols) and are extensible in accordance with load requirements.

One or more embodiments of the invention may be implemented in part by computer software in the form of computer readable code executed on a general purpose computer, in the form of bytecode class files executable within a Java™ runtime environment running on such a computer, or in the form of bytecodes running on a processor (or devices enabled to process bytecodes) existing in a distributed environment (e.g., one or more processor on a network). In general, any suitable computer system and programming/processing environment may be used.

Figure 1:
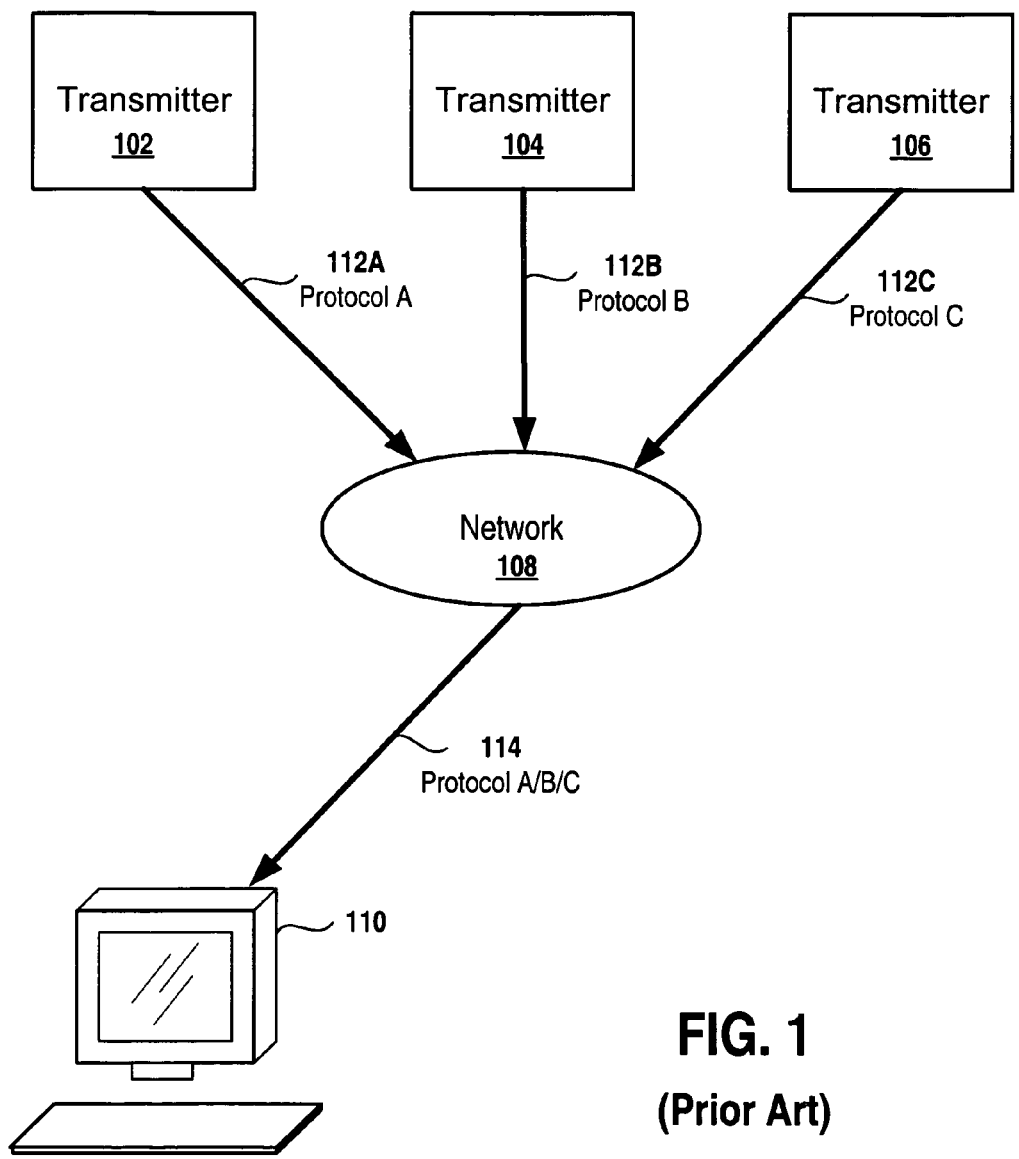
FIG. 1 is a block diagram of a network system having a single receiver and multiple transmitters.
Figure 2:
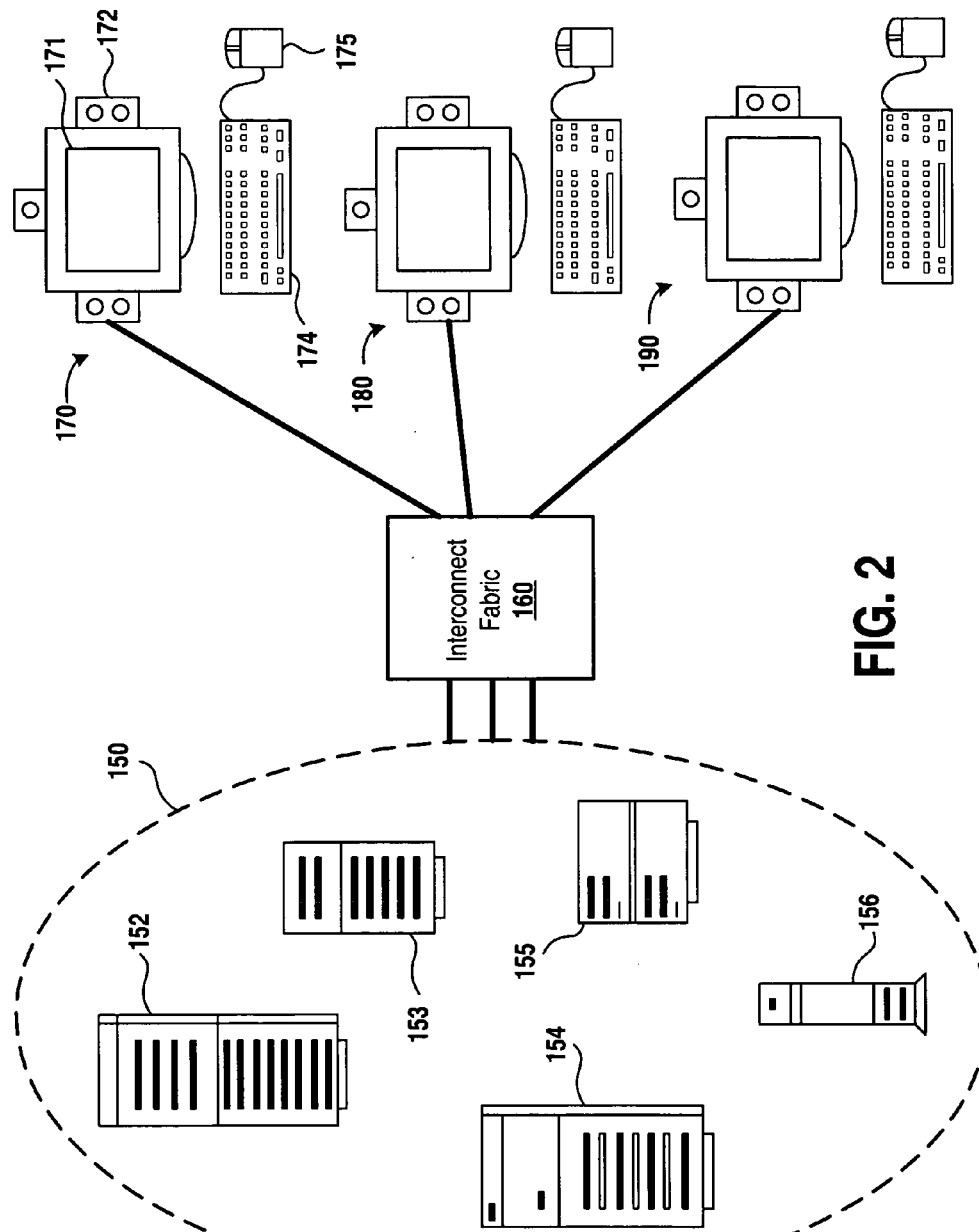
FIG. 2 illustrates a virtual desktop system architecture that may be used to implement the invention.

In one embodiment, the present invention may be implemented in computer systems where the data is provided through a network such as a local area network (LAN), a wide area network (WAN), the internet, world wide web (Web), or any other suitable network configurations. FIG. 2 illustrates a virtual desktop architecture where one or more servers (e.g., servers 152 through 156) communicate with one or more desktop units (DTUs) such as DTUs 170, 180 and 190 through an interconnect fabric 160.

The functionality of the virtual desktop system is partitioned between a display and input device (the combination of which is referred to as a "human interface device" or an "HID"), and data sources or services. Specifically, state and computation functions typically reside in data sources/services 150 while input and display functions typically reside at the HID. Data sources/services are typically not tied to a specific computer and may be distributed over one or more traditional desktop systems or traditional servers. For example, one computer may have one or more services, or a service may be implemented by one or more computers. In general, services provide computation, state and data to the HIDs and services are typically controlled under a common authority or manager (e.g., service manager).

Services may be, but are not limited to Java™ program execution services, X11/Unix services, archived video services and Windows NT services. In general, a service is a process that provides output data and responds to user requests and input. For example, services may have the responsibility to handle communications with the HID that is currently being used. The communication may involve taking the output from the computational service and converting it into a standard protocol for the HID. This data protocol conversion may be handled by, e.g., a middleware layer, such as an X11 server, the Microsoft Windows interface, a video format transcoder, the OpenGL interface, or a variant of the java.awt.graphics class within the service producer machine.

The service machines, e.g., computer 152, 153, 154, 155 and 156, handle the translation to and from the virtual desktop architecture wire protocol. Computers 152, 153, 154, 155 and 156 may be service producing machines such as a proxy for another device providing the computational service (e.g., a database computer in a three tiered architecture, where the proxy computer might only generate queries and execute user interface code). Any of computers 152, 153, 154, 155 and 156 may be implemented as a transmitter. In one embodiment, computers 152, 153, 154, 155 and 156 connect directly to DTUs 170, 180 and 190 through interconnect fabric 160.

Interconnect fabric 160 may be any suitable communication paths for carrying data between services 150 and DTUs 170, 180, and 190. In one embodiment, interconnect fabric 160 is a local area network implemented as an Ethernet network. Other local network, wide area networks, the internet, the world wide web, and other types of communication path may also be utilized. Interconnect fabric 160 may be implemented with a physical medium such as a wire or fiber optic cable, or it may be implemented in a wireless environment.

DTUs 170, 180, and 190 are the means by which users access the computational services provided by the servers or services 150, and as such, DTUs 170, 180 and 190 may also be referred to as a client, user workstation, terminal or HID. Typically, a desktop unit includes a display, a keyboard, a mouse and audio speakers. For example, DTU 170 includes a display 171, a keyboard 174, a mouse 175, and audio speakers 172. In general, DTUs include the electronics needed to interface attached devices (e.g., display, keyboard, mouse and speakers) to interconnect fabric 160 and to transmit data to and receive data from the services 150.

Desktop units 170, 180 and 190 may be any suitable computer systems, including general purpose computers, client-server systems, or network computers. For example, desktop units 170, 180 and 190 may be workstations from, e.g., Sun Microsystems, Inc., IBM Corporation, Hewlett Packard, Digital and other manufacturers. Any of DTUs 170, 180 and 190 may be implemented as a receiver.

Keyboard 174 and mouse 175 introduce user input and communicate that user input with the DTU they are attached to. Other suitable input devices (e.g., scanner, digital camera) may be used in addition to, or in place of, keyboard 174 and mouse 175. Display 171 and audio speakers 172 are output devices. Other suitable output devices (e.g., printer) may be used in addition to, or in place of, display 171 and audio speakers 172.

Figure 3:
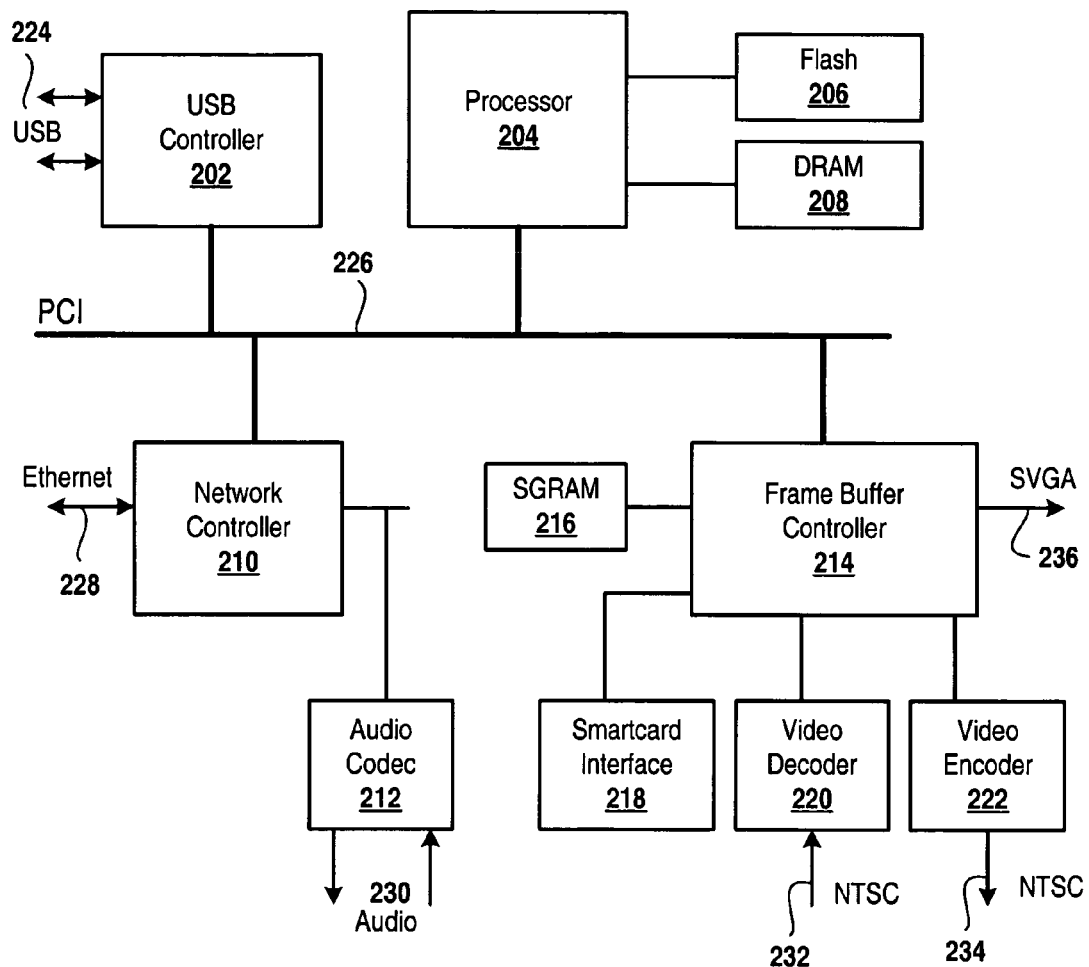
FIG. 3 shows a block diagram of a desktop unit.

FIG. 3 shows a block diagram of an embodiment of the desktop unit illustrated in FIG. 2. Various components of the DTU are coupled internally to a Peripheral Component Interconnect (PCI) bus 226. A network controller 210 is coupled to PCI bus 226 and communicates to an interconnect fabric such as an ethernet, through path 228. An audio codec 212 receives audio data on interface 230 and is coupled to network controller 210. Audio codec may be a hardware circuit (chip) or software routine that converts sound into digital code and vice versa.

Universal Serial Bus (USB) data communication is provided on path 224 to a USB controller 202 which is coupled to PCI bus 226.

An embedded processor 204 is coupled to PCI bus 226. Embedded processor 204 may be, for example, a Sparc2ep, which is coupled to a flash memory 206 and a dynamic random access memory (DRAM) 208. In the alternative, processor 204 may be a SPARC™ microprocessor manufactured by Sun Microsystems, Inc., a 680X0 processor manufactured by Motorola, a 80X86 manufactured by Intel, a Pentium processor, or any other suitable microprocessor or microcomputer.

A video controller, e.g., frame buffer controller 214, is also coupled to PCI) bus 226. Video controller 214 may be, for example, an ATI RagePro+ frame buffer controller (or any other suitable controller) that provides SVGA (Super Video Graphics Array) output on path 236. National TV Standards Committee (NTSC) or Phase Alternating Line (PAL) data may be provided via path 232 into the video controller 214 through video decoder 220. Similarly, NTSC or PAL data may be provided to path 234 from video controller 214 through a video encoder 222. A smart card interface 218 and an Synchronous Graphics Random Access Memory (SGRAM) 216 may also be coupled to video controller 214.

The functions described above for desktop units 170, 180 and 190 may be implemented using a single chip that includes necessary processing capabilities and graphic renderer.

Figure 4:
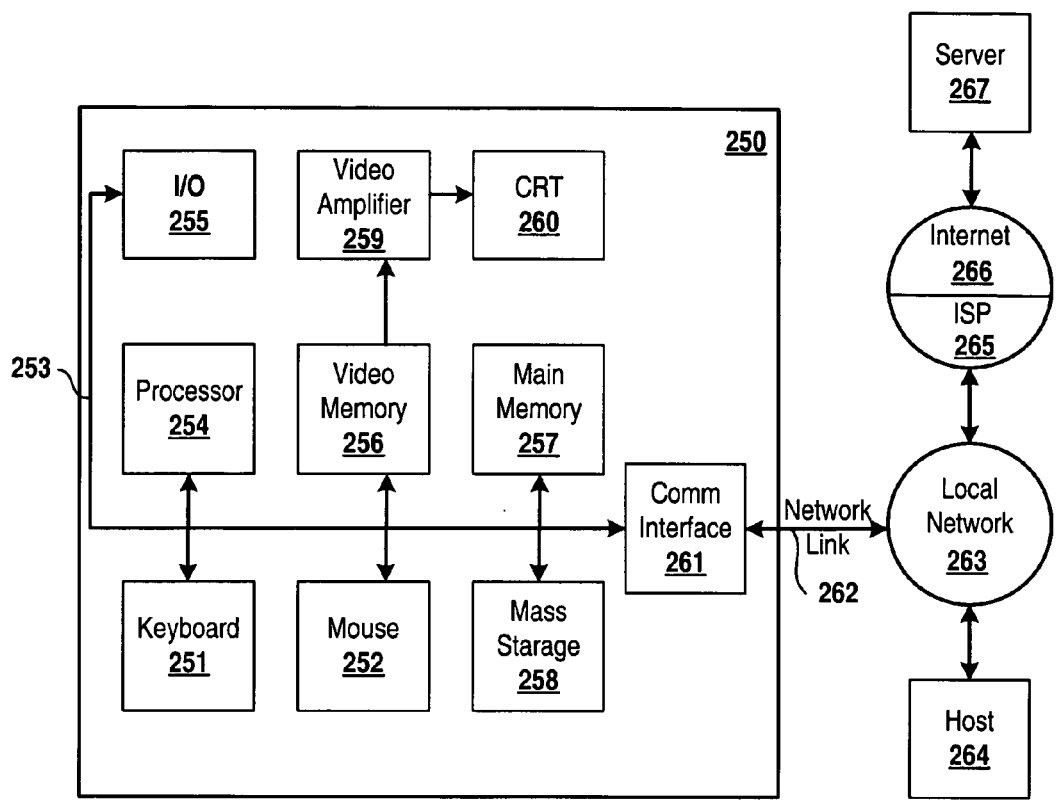
FIG. 4 illustrates a block diagram of a general purpose computer.

FIG. 4 shows a general purpose computer 250 that may be used to implement servers 152 through 156 shown in FIG. 2. A keyboard 251 and mouse 252 are coupled to a bi-directional system bus 253. Keyboard 251 and mouse 252 introduce user input to computer system 250 and communicate user input to a processor 254. Other suitable input devices may be used in addition to, or in place of, mouse 252 and/or keyboard 251. Input/output (I/O) unit 255 coupled to bi-directional system bus 253 represents I/O elements as a printer, audio/video (A/V) I/Os, etc.

Bi-directional system bus 253 may contain, for example, thirty-two address lines for addressing a video memory 256 or a main memory 257. System bus 253 may also includes, for example, a 32-bit data bus for transferring data between and among components, e.g., processor 254, main memory 256, video memory 256 and mass storage 258, all coupled to bus 253. Alternatively, multiplex data/address lines may be used instead of separate data and address lines.

Processor 254 may be a microprocessor manufactured by Motorola (e.g., 680X0 processor), a microprocessor manufactured by Intel (e.g., 80X86 or Pentium processor) or a SPARC microprocessor from Sun Microsystems, Inc. Other suitable microprocessor or microcomputer may be utilized.

Main memory 257 may comprise dynamic random access memory (DRAM) or other suitable memories. Video memory 256 may be a dual-ported video random access memory. For example, one port of video memory 256 may be coupled to a video amplifier 259 which is used to drive a monitor 260 which may be a cathode ray tube (CRT) raster monitor, a liquid crystal display (LCD), or any suitable monitors for displaying graphic images. Video amplifier 259 is well known in the art and may be implemented by any suitable apparatus. In one embodiment, pixel data stored in video memory 256 is converted to a raster signal suitable for use by monitor 260. Mass storage 258 may include both fixed and removable media, such as magnetic, optical or magnetic optical storage systems or any other available mass storage technology.

Computer 250 may include a communication interface 261 coupled to bi-directional system bus 253. Communication interface 261 provides a two-way data communication via a network link 262 to a local network 263. For example, if communication interface 261 is an integrated service digital network (ISDN) card or a modem, communication interface 261 provides a data communication connection to the corresponding type of telephone line, which comprises part of network link 262. If communication interface 261 is a local area network, (LAN) card, communication interface 261 provides a data communication connection via network link 262 to a compatible LAN. Wireless links are also possible. In any such implementation, communication interface 261 sends and receives electrical, electromagnetic or optical signals which carry digital data streams representing various types of information.

Network link 262 typically provides data communication through one or more networks to other data devices. For example, network link 262 may provide a connection through local network 263 to a host computer 264 or to data equipment operated by an Internet Service Provider (ISP) 265. ISP 265 in turn provides data communication services through the world wide packet data communication network commonly referred to as the "internet" 266. Local network 263 and internet 266 both use electrical, electromagnetic or optical signals which carry digital data streams. The signals through the various networks and the signals on network link 262 and through communication interface 261, which carry the digital data to and from computer 250, are exemplary forms of carrier waves transporting the information.

Computer 250 can send messages and receive data, including program code, through these communication channels. In the Internet example, server 267 might transmit a requested code for an application program through Internet 266, ISP 265, local network 263 and communication interface 261. The received code may be executed by processor 254 as the code is received, and/or stored in mass storage 258, or other non-volatile storage for later execution. In this manner, computer 250 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Figure 5:
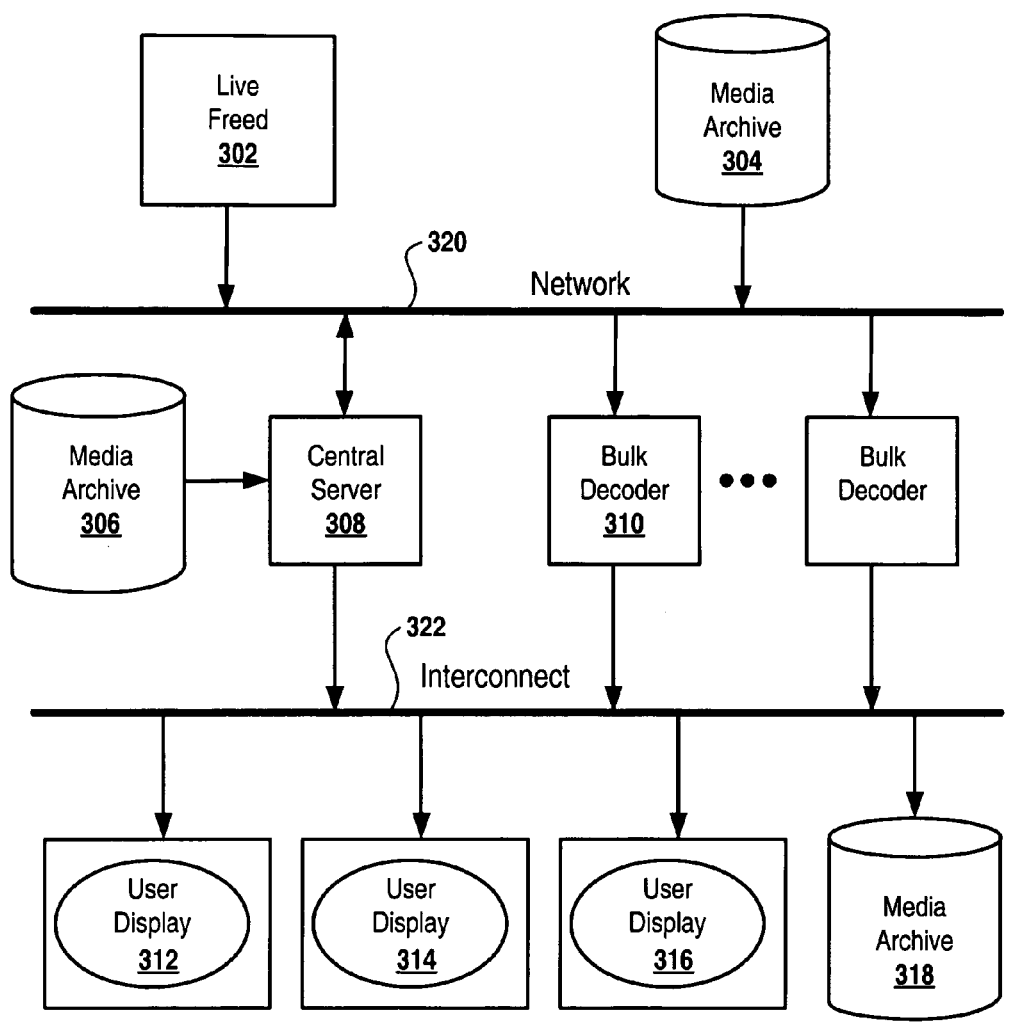
FIG. 5 is a block diagram of a network system in accordance with one embodiment of the present invention.

FIG. 5 shows a physical topology of a system architecture in accordance with one embodiment of the present invention. A central server 308 is coupled to a network 320. Central server 308 may be, for example, a SPARC™ server running Solaris™ Operating Environment that hosts the Sun Ray™ enterprise server software. In general, central server 308 may be any suitable computer that is capable of maintaining and managing a network of appliances. Network 320 may be a local area network (LAN), a wide area network (WAN), the internet, world wide web (WEB), or any other suitable network configuration.

Central server 308 may receive data from a media archive 306 or a mass storage that is directly attached to central server 308. Media archive 306 or mass storage may be a part of central server 308. The media archive (or mass storage) may be a semi-permanent or a permanent holding place for data and may be, for example, magnetic disks, magnetic tapes or optical storage devices. If the data is in a form ready for output (e.g., in basic data format), central server 308 directs the data to appropriate devices for displaying or archiving via an interconnect 322. Interconnect 322 may use any suitable local area network technologies including, but is not limited to, ethernet, gigabit ethernet, switched ethernet, fast ethernet, and token ring. The connections between central server 308 and user displays 312, 314 and 316 and media archive 318 through interconnect 322 may be direct or switched.

If the data is encoded, central server 308 may direct the data to a bulk decoder 310 via network 320. Bulk decoder 310 may also receive encoded data from, e.g., a live data source 302 or a media archive 304, over network 320. Live data source 302 may transmit encoded data in various data formats such as video, audio, graphics, video conference or other media formats using different protocols. Bulk decoder 310 receives the encoded data from network 320 and decodes the encoded data by reversing the encoding process and placing the data in an appropriate format for playback. Bulk decoder 310 may be a hardware or a software device that decodes data and may be configured to have capabilities for processing various forms of encoding. In one embodiment, bulk decoder 310 may be an application-specific hardware. In another embodiment, bulk decoder 310 may be a general purpose computer.

In one embodiment of the present invention, bulk decoder 310 may be a stand-alone unit, meaning that bulk decoder 310 is not a function provided by central server 308. Bulk decoder 310 transmits the decoded data to an appropriate device such as a user display (e.g., user displays 312, 314 and 316) or a media archive (e.g., media archive 318) through interconnect 322. Media archive 318 may be the same unit as media archive 304 or media archive 306. Other output devices may also be used, for example, speakers.

Additional bulk decoders may be added to the network if additional decoding resources are needed. In other words, the number of bulk decoders may be scalable with respect to the decoding capacity and capability requirements of the system and the decoding capacity and capability of each bulk decoders. As will be described later, each bulk decoder may be configured to accommodate different types of decoders for various data formats. Each bulk decoder may also be configured to handle different load requirements.

In one embodiment, bulk decoder 310 may be modular to enable plug-and-play. For example, if bulk decoder 310 cannot meet the load requirements, another bulk decoder may be added (e.g., plugged in) to expand the decoding capability of the system. The plug-and-play of additional bulk decoders may be accomplished without disturbing the ongoing operation of the existing decoders because networks are generally more serviceable than, e.g., computer peripheral busses. Therefore, as new load is realized, additional decoding resources may be added to expand the decoding capacity with minimal disturbance to the system.

Figure 6:
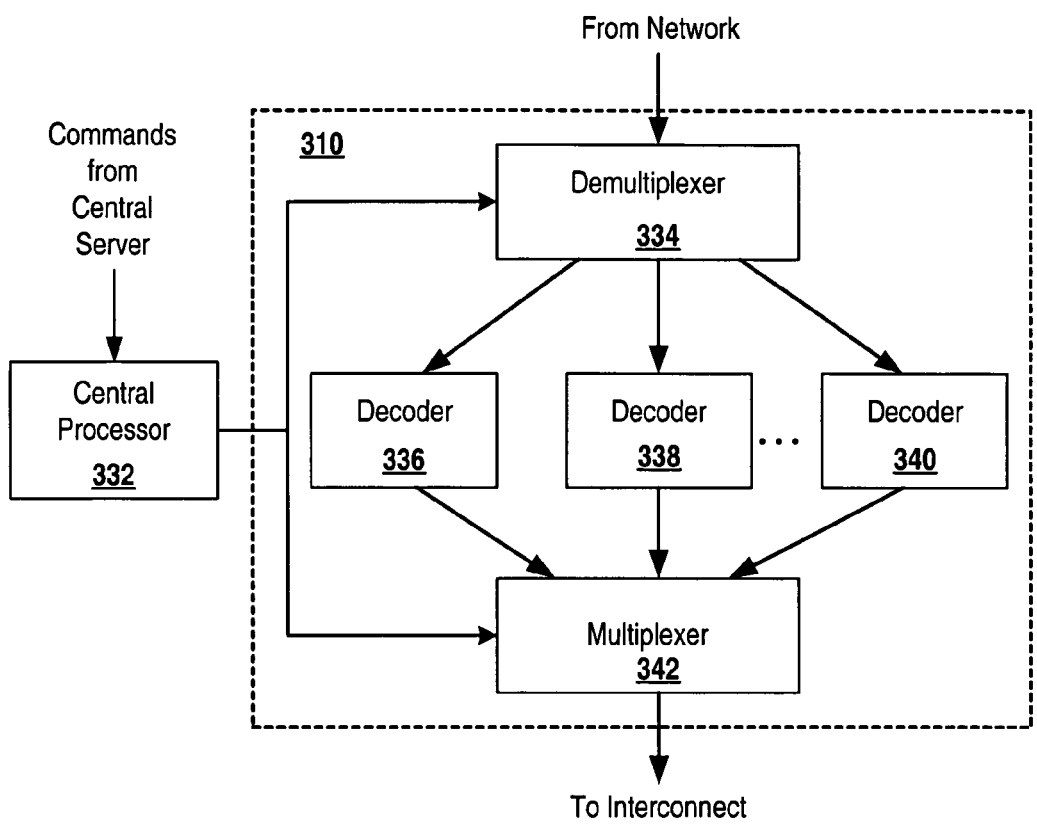
FIG. 6 is a block diagram of a bulk decoder in accordance with one embodiment of the present invention.

FIG. 6 shows a unit block diagram of the bulk decoder shown in FIG. 5. In this embodiment, bulk decoder 310 includes a demultiplexer 334 and a multiplexer 342 which are coupled to a central processor 332. Central processor 332 may be located in bulk decoder 310 and may receive commands from central server 308. By having its own processor, bulk decoder 310 may perform the decoding function independently on its own once it receives the decoding command from, e.g., central server 308. In the alternative, central processor 332 may be part of central server 308 (FIG. 5).

Central processor 332 directs demultiplexer 334 to convert data transmissions that contain several intermixed signals into its original separate signals. The demultiplexed signals are transmitted to appropriate decoders 336, 338 and 340 for decoding. For example, decoder 336 may be capable of decoding Moving Pictures Experts Group (MPEG) signals; decoder 338 may be capable of decoding Joint Photographic Experts Group (JPEG) signals; and decoder 340 may be capable of decoding H.261 signals. The number and types of decoders depends on the data format of the signals the bulk decoder needs to process and the load it needs to handle. In some embodiments, bulk decoder may include eight to ten decoders.

The decoded signals are multiplexed by multiplexer 342 which combines multiple signals and transmits the combined signals over a single communications line or computer channel such as interconnect 322 (FIG. 5). In general, any suitable demultiplexing/multiplexing method may be use, including, but is not limited to, Frequency Division Multiplexing (FDM) and Time Division Multiplexing (TDM). In one embodiment, multiplexer 342 ensures that the data is addressed to the correct destination (e.g., output device). For example, data may be encapsulated into packets with destination codes such as IP protocols.

Figure 7:
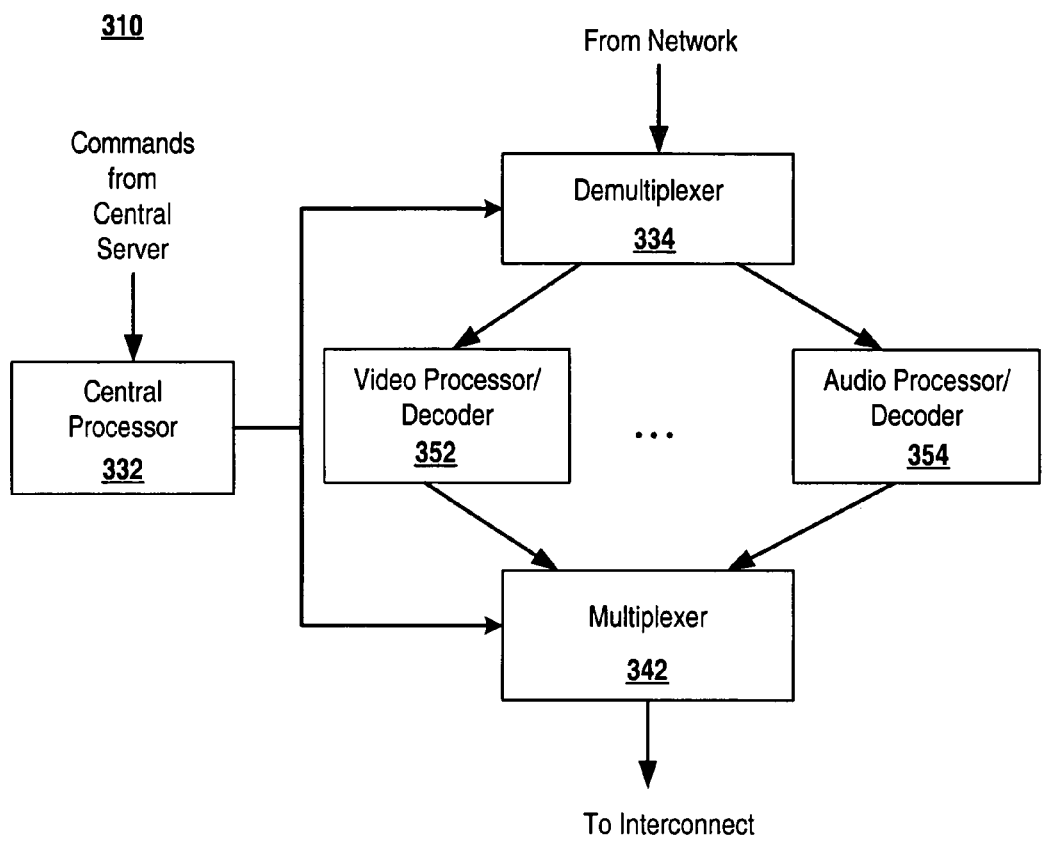
FIG. 7 is a block diagram of a bulk decoder in accordance with one embodiment of the present invention.

FIG. 7 shows another embodiment of the bulk decoder shown in FIG. 5. In this embodiment, specialized processors may be located between the network where data is available and the interconnect that connects the distributed output devices (e.g., displays) to the central computing resources (e.g., services). The specialized processors convert data transmissions into a single protocol.

Bulk decoder 310 may include a central processor 332 coupled to a demultiplexer 334 and a multiplexer 342 as described above. Central processor 332 receives command from central server 308 and then directs demultiplexer 334 to convert data transmissions that contain several intermixed signals into its original separate signals, e.g., video signals and audio signals. The video signals may contain video data in various formats. The video data may be transmitted to a video processor 352 which converts the video data into a single designated protocol. Each desktop unit (user) may be equipped or configured to understand the designated video protocol. Since the various data formats have been decoded and converted into one protocol, each desktop unit may display the data regardless of its original format.

Similarly, a specialized audio processor 354 may be placed between the network and the interconnect to convert audio data into a single audio protocol. Transmitters (e.g., servers) may be equipped with drivers to provide for conversion of audio data into the designated protocol as needed. Each user may be configured to understand the designated audio protocol. As a result, each user may play the audio data regardless of the data's original format and without having to employ multiple decoders at each client site. In other words, the data may be decoded once and converted into a protocol all clients can understand using one set of decoders (the network shared decoders). Therefore, the decoders do not need to be duplicated for each client.

Other types of decoders such as graphics decoders may be added to the bulk decoder. In general, bulk decoder 310 may contain a predetermined number and predetermined types of decoders. Multiplexer 342 then multiplexes the various signals (e.g., audio and the video signals) for transmission to various output devices through an interconnect.

While the present invention has been described with reference to particular figures and embodiments, it should be understood that the description is for illustration only and should not be taken as limiting the scope of the invention. Many changes and modifications may be made to the invention, by one having ordinary skill in the art, without departing from the spirit and scope of the invention. For example, encoded data may be presented on the interconnect or virtual networks to minimize the number of network connections provided by the hardware.

We claim:

1. A network system, comprising:
   a server coupled to a network;
   a bulk decoder coupled to the network and a data network interconnect, the bulk decoder configured to receive a signal from the network, the bulk decoder being controlled by the server, the bulk decoder including,
      a processor, the processor capable of receiving the signal from the network, the processor further capable of converting the signal into a single protocol format signal when the signal includes intermixed data types; and
   at least one device coupled to the network data interconnect, the device configured to accept a decoded signal from the bulk decoder, the decoded signal being transmitted from the bulk decoder via the network data interconnect.

2. The network system of claim 1, wherein the bulk decoder further includes:
   at least one decoder for decoding the signal from the network.

3. The network system of claim 2, further comprising:
   a demultiplexer coupled between the network and the processor and the at least one decoder for demultiplexing the signal; and
   a multiplexer coupled to the processor and the at least one decoder for multiplexing the decoded signal.

4. The network system of claim 1, further comprising a plurality of bulk decoders coupled to the network.

5. A method for sharing decoding resources in a network system, the method comprising:
   transmitting a signal to a network, wherein the signal comprises intermixed data signals;
   decoding the signal using a bulk decoder coupled to the network and a network data interconnect, the bulk decoder being capable of decoding the signal into single data type signals having single protocol format signals, wherein decoding the signal includes:
      demultiplexing the signal to obtain individual data signals,
      decoding the individual data signals, and
      multiplexing the decoded individual data signals to obtain a decoded signal;
   transmitting the decoded individual data signals to the network data interconnect; and
   controlling the bulk decoder using a server coupled to the network.

6. The method of claim 5, further comprising transmitting the multiplexed decoded individual data signals to corresponding output devices coupled to the network data interconnect.

7. The method of claim 5, further comprising representing the decoded individual data signals by one protocol.

8. The method of claim 5, further comprising adjusting the number of bulk decoders coupled to the network in accordance with a system load.

* * * * *